US005748947A

United States Patent [19]

Fukushima

[11] Patent Number: 5,748,947

[45] Date of Patent: May 5, 1998

[54] INFORMATION PROCESSING SYSTEM FOR SWITCHABLY PROCESSING DATA ASSOCIATED WITH STRAIGHT LINE VECTORS

[75] Inventor: Tokutaro Fukushima, Sagamihara, Japan

[73] Assignee: Ricoh Company, Ltd., Tokyo, Japan

[21] Appl. No.: 768,538

[22] Filed: Dec. 18, 1996

Related U.S. Application Data

[63] Continuation of Ser. No. 580,773, Dec. 29, 1975, abandoned, which is a continuation of Ser. No. 200,424, Feb. 23, 1994, abandoned.

[30] Foreign Application Priority Data

Feb. 25, 1993 [JP] Japan .................................. 5-036917

[51] Int. Cl.[6] .................................................. G06F 15/00

[52] U.S. Cl. .......................... 395/501; 395/509; 395/513; 395/515; 395/102; 395/114

[58] Field of Search .................................... 395/106, 115, 395/109, 114, 102, 131–132, 139, 501, 507, 509, 511, 513, 515, 523, 526; 382/251–254, 232, 298–300; 358/448–455, 458; 345/63, 89, 147, 185, 189, 127–130

[56] References Cited

U.S. PATENT DOCUMENTS

| | | | |
|---|---|---|---|
| 4,862,154 | 8/1989 | Gonzalez-Lopez | 345/201 |
| 4,987,553 | 1/1991 | Oneda et al. | 395/143 |
| 5,204,959 | 4/1993 | Sakuragi | 395/102 |
| 5,287,419 | 2/1994 | Sato et al. | 382/54 |
| 5,357,601 | 10/1994 | Kagawa | 395/139 |
| 5,361,329 | 11/1994 | Morita et al. | 395/102 |

FOREIGN PATENT DOCUMENTS

| | | | |
|---|---|---|---|
| 0 266 506 A2 | 11/1988 | European Pat. Off. | G09G 1/16 |
| 181886 | 7/1990 | Japan . | |

OTHER PUBLICATIONS

Research Disclosure, "Reproduction Apparatus Providing User Manual and Other Documentation", pp. 201–203.

"Calamus 1.09n", Atari ST platform, Halco Sunbury Co. Ltd., 1992, Chapter 12, p. 217.

*Primary Examiner*—Kee M. Tung
*Attorney, Agent, or Firm*—Lowe, Price, LeBlanc & Becker

[57] ABSTRACT

An image-memory stores image data in a form such that the thus stored image data may be used for realizing the corresponding image on a recording medium. A straight-line-vector processing unit processes straight line vectors associated with image data provided thereto so that the resulting data may be used to be stored in the image-memory. A data switching unit switches so that either the data obtained from the straight-line-vector processing unit may be stored in the image-memory or data obtained from an image inputting unit may be stored in the image-memory. A data expanding unit expands the image data provided from a host computer into the corresponding main-scan-direction straight line vectors. A data generating unit generates the start and end addresses associated with the straight line vectors and the relevant density values associated with the image data. The image-memory comprises areas, each provided for a respective basic color component associated with the data to be stored, for storing either single tone values or multi-tone values. An image rendering unit writes the image data in each dot in the image-memory means based on the data provided by the straight-line-vector processing means. The image inputting unit comprises an image scanner.

24 Claims, 14 Drawing Sheets

INFORMATION PROCESSING SYSTEM FOR SWITCHABLY PROCESSING DATA ASSOCIATED WITH STRAIGHT LINE VECTORS

This application is a continuation of application Ser. No. 08/580,773 filed Dec. 29, 1995 now abandoned which is a continuation of application Ser. No. 08/200,424 filed Feb. 23, 1994 now abandoned.

BACKGROUND OF THE INVENTION

1. Field of the Invention

The present invention relates to an information processing system which is able to use data associated with straight line vectors so as to render a corresponding image, and, in particular, relates to technology wherein the same image memory is used whether rendering an image based on image data provided from a host computer or based on image data input through a scanner.

2. Related Art

Japanese Laid-Open Patent Application No. 2-181886 discloses an image processing system which processes straight line vectors. Operation of an information processing system comprising such an image processing system will be described with reference to FIG. 1.

In this information processing system, image data produced through a host computer 1 using a page-description language, of which PostScript is a typical example, is used to render the corresponding image in an image memory 2.

The entirety of the relevant image data (vector data) is represented by vectors. The vectors are completely converted by a CPU 3 into main-scan-direction straight-line vectors by expanding them. The coordinates of the start points and end points of the straight line vectors and the relevant density values are temporarily stored in a first-in, first-out memory (abbreviated 'FIFO', hereinafter) 4.

Data stored in the FIFO 4 is latched by a main-scan-direction start-address register (referred to as 'XS register', hereinafter) 5, a main-scan-direction end-address register (referred to as 'XE register', hereinafter) 6, a sub-scan-direction start-address register (referred to as 'YS register', hereinafter) 7, and a density register (referred to as 'RGB register', hereinafter) 8.

A rendering command provided by the CPU 3 causes a memory controller 9 to generate a write signal, the controller 9 then beginning to write density data specified by the RGB register 8 at the address, in an image memory 2, specified by the XS register 5 and YS register 7. Together with the above beginning of the writing operation, the main-scan-direction address counter (referred to as 'X address counter', hereinafter) 10 begins its counting operation, incrementing (+1) the relevant address value initially loaded by the XS register 5.

Then, after the relevant address value becomes the same as the value in the XE register 6, an X comparator 11 acting as a main-scan-direction comparator reports, to the memory controller 9, that the last dot has been rendered. Thus, the straight-line-vector data is used to render the corresponding image. Repeating the above operation results in rendering one page of image data specified by the host computer 1 in the image memory 2.

However, in the above-described information processing system in the related art, only image data which has been received by the CPU from the host computer may be stored in the image memory. Therefore, if it is desired to print out an image based on data obtained as a result of the original image being read the scanner, then in addition to the above image memory for data from the host computer, another image memory has to be provided for data input through the scanner, thus resulting in additional costs to the system.

SUMMARY OF THE INVENTION

An object of the present invention is to enable a single image memory to be used to store image data provided either from a host computer or from a scanner, the corresponding image being thus rendered.

To achieve the above object of the present invention, an image processing system according to the present invention comprises:

- image-memory means for storing image data in a form such that the thus stored image data may be used for realizing the corresponding image on a recording medium
- straight-line-vector processing means for processing straight line vectors associated with image data provided thereto so that the resulting data may be used to be stored in said image-memory means;
- data switching means for switching so that the either data obtained from said straight-line vector processing means may be stored in said image-memory means or data obtained from image inputting means may be stored in said image-memory means.

Further, said straight-line-vector processing means may comprise:

- data expanding means for expanding the image data provided from a host computer into the corresponding main-scan-direction straight-line vectors; and
- data generating means for generating the start and end addresses associated with the straight line vectors and the relevant density values associated with the image data;
- said image-memory means may comprise image memories, each provided for a respective basic color component associated with the data to be stored, for storing either single tone values or multi-tone values; and
- said image processing system further comprises image rendering means for writing the image data in each dot in said image memory based on the data provided by said straight-line-vector processing means; and
- wherein said image inputting means may comprise an image scanner.

The above construction can eliminate additional image memory for data from an image scanner, thus reducing the cost of the system.

Further, according to the present invention, reduction of the area about which the scanner scanning to read an original image; and/or performance of the dither processing on the image data obtained by the scanner may prevent the finally rendered image from being degraded in image quality. Such processing is effective in a case where the number of tone levels associated with the image data provided through the scanner is larger than the number of tone levels with which the image memory may store the relevant image data. Such differences in the numbers of tone levels may result in degradation of the finally rendered image unless the above processing is performed.

Further, in accordance with the present invention, mixing between data provided from both the host computer and that from the scanner becomes possible.

For this purpose, the above-described image processing system further comprises:

a main scan direction counter for generating the addresses, in the main scan direction, to be provided to said image rendering means;

a sub-scan direction counter for generating the addresses, in the sub-scan direction, to be provided to said image rendering means;

dimension converting means for converting the two-dimensional addresses provided by said main scan and sub-scan counters into the one-dimensional addresses to be used for said image-memory means.

As a result, it is possible to give both kinds of address the same address format, the two kinds of address comprising a first kind which is used for writing the image data in the image memory and a second kind of address associated with the image data input through the scanner. Thus, combining of data provided from the host computer and the scanner so that a composite image is printed out may be performed, the capability of the image processing system being thus improved.

The image processing system, may further comprise:

a main scan direction start register for storing main scan direction start coordinates of rectangular areas;

a main scan direction end register for storing main scan direction end coordinates of said rectangular areas;

a sub-scan direction start register for storing sub-scan direction start coordinates of rectangular areas;

a sub-scan direction end register for storing sub-scan direction end coordinates of said rectangular areas;

a main scan direction comparator for comparing the data provided by said main scan direction counter and the data stored in said main scan direction end register; and a sub-scan direction comparator for comparing the data provided by said sub-scan direction counter and the data stored in said sub-scan direction end register.

As a result, it is possible to write the image data input through the scanner to an arbitrary rectangular area in the image memory. Thus, the above data combining behavior is achieved.

The image processing system may further comprise background-image preserving means for controlling read, modify and write processing for said image memories, said preserving means overlaying the image data stored in said image memories with the image data input through said data inputting means so as to write the resulting data in said image memories.

As a result, the above data combining process may be ensured as a result of the image data previously written in the image memory being maintained as it is.

Other objects and further features of the present invention will become more apparent from the following detailed description when read in conjunction with the accompanying drawings.

DESCRIPTION OF THE PREFERRED EMBODIMENTS

Figure 1:
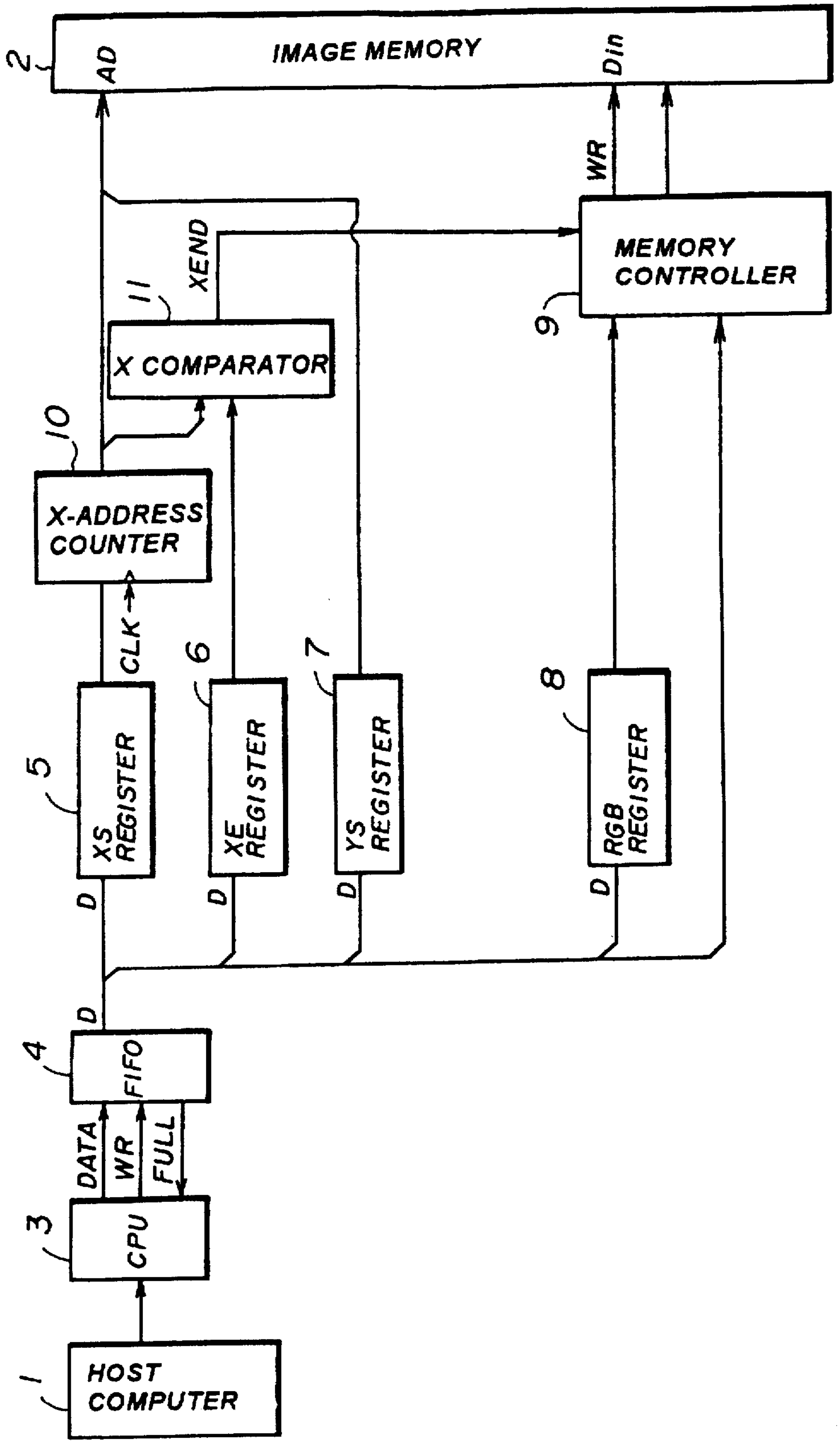
FIG. 1 PRIOR ART
FIG. 1 shows a block diagram of an information processing system in a related art.

An embodiment of the information processing system according to the present invention will be described with reference to FIGS. 2, 3 and 4. The same reference numerals are given to components corresponding to those in FIG. 1.

Figure 2:
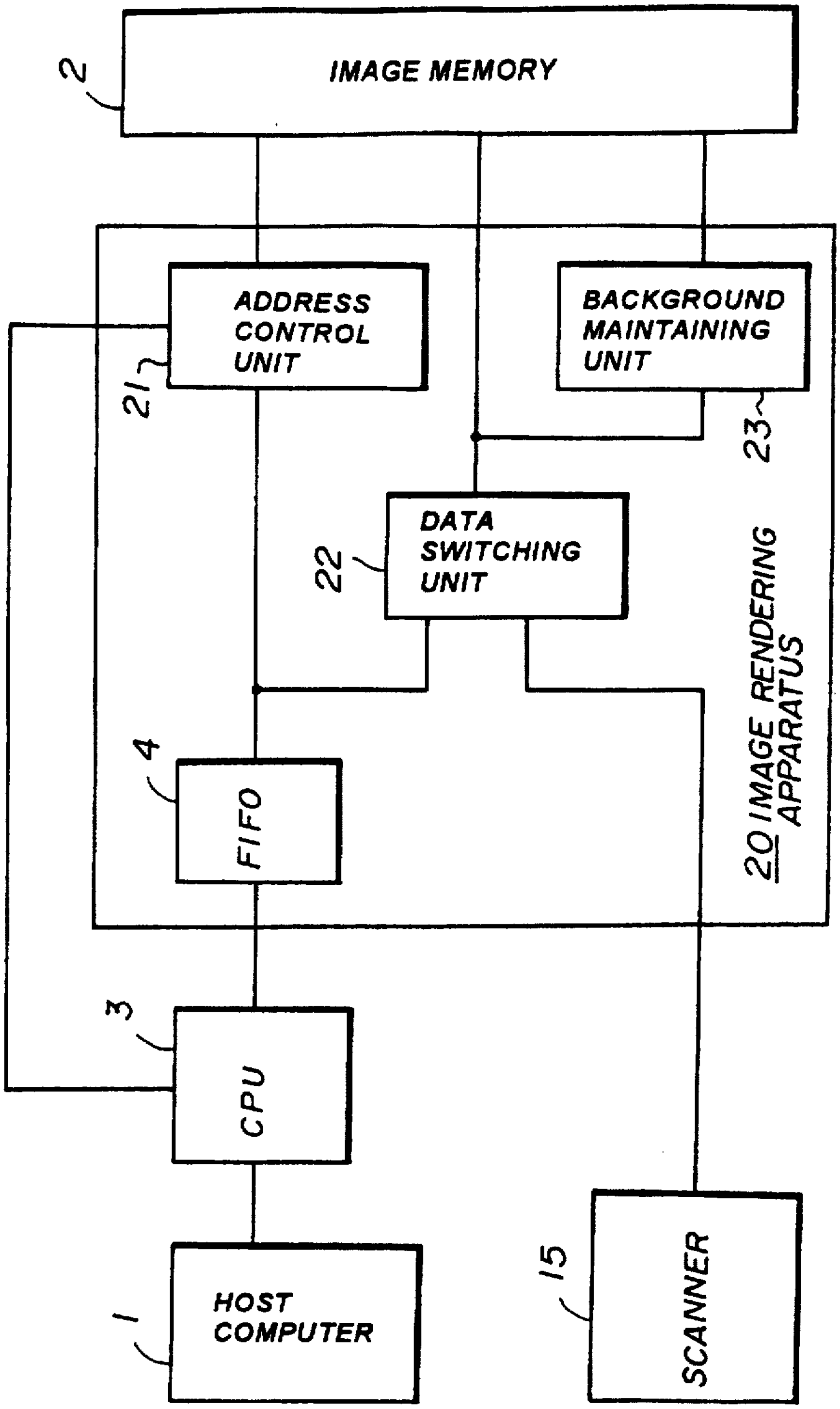
FIG. 2 shows a function block diagram of an embodiment of an information processing system according to the present invention.

As shown in FIG. 2, this information processing system comprises the host computer 1; an image processing system that incorporates the image memory 2, the CPU 3 and an image rendering apparatus 20; and the scanner 15 for reading in an original image so as to provide the corresponding image data.

The image rendering apparatus 20 comprises address control unit 21, data switching unit 22 and background maintaining unit 23, each comprising essential parts of the present invention, as well as the FIFO 4 for temporarily storing the respective data units provided by the CPU 3.

Figure 3:
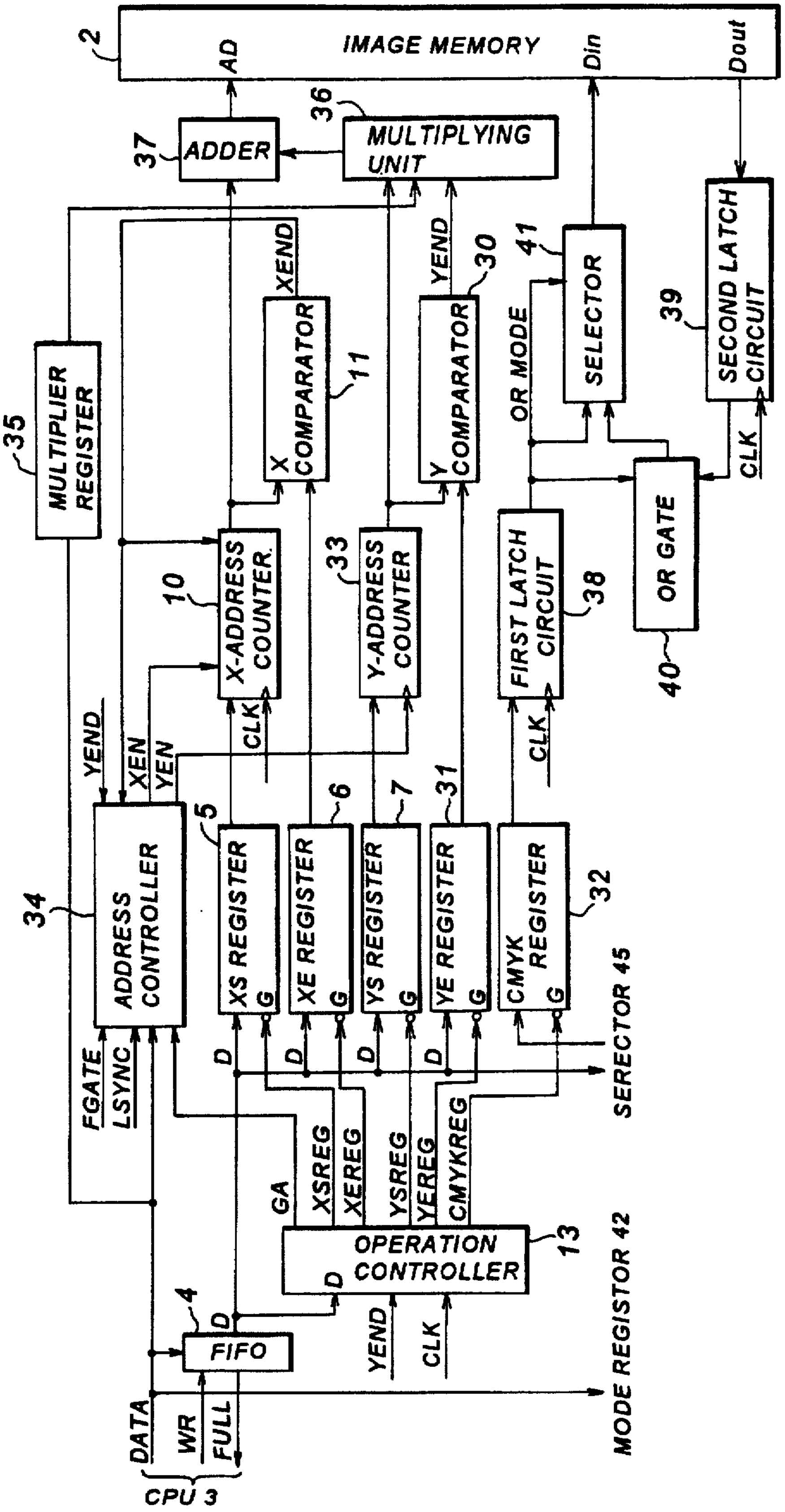
FIG. 3 shows in detail a block diagram of part of an image rendering apparatus in the embodiment of the information processing system shown in FIG. 2.
Figure 4:
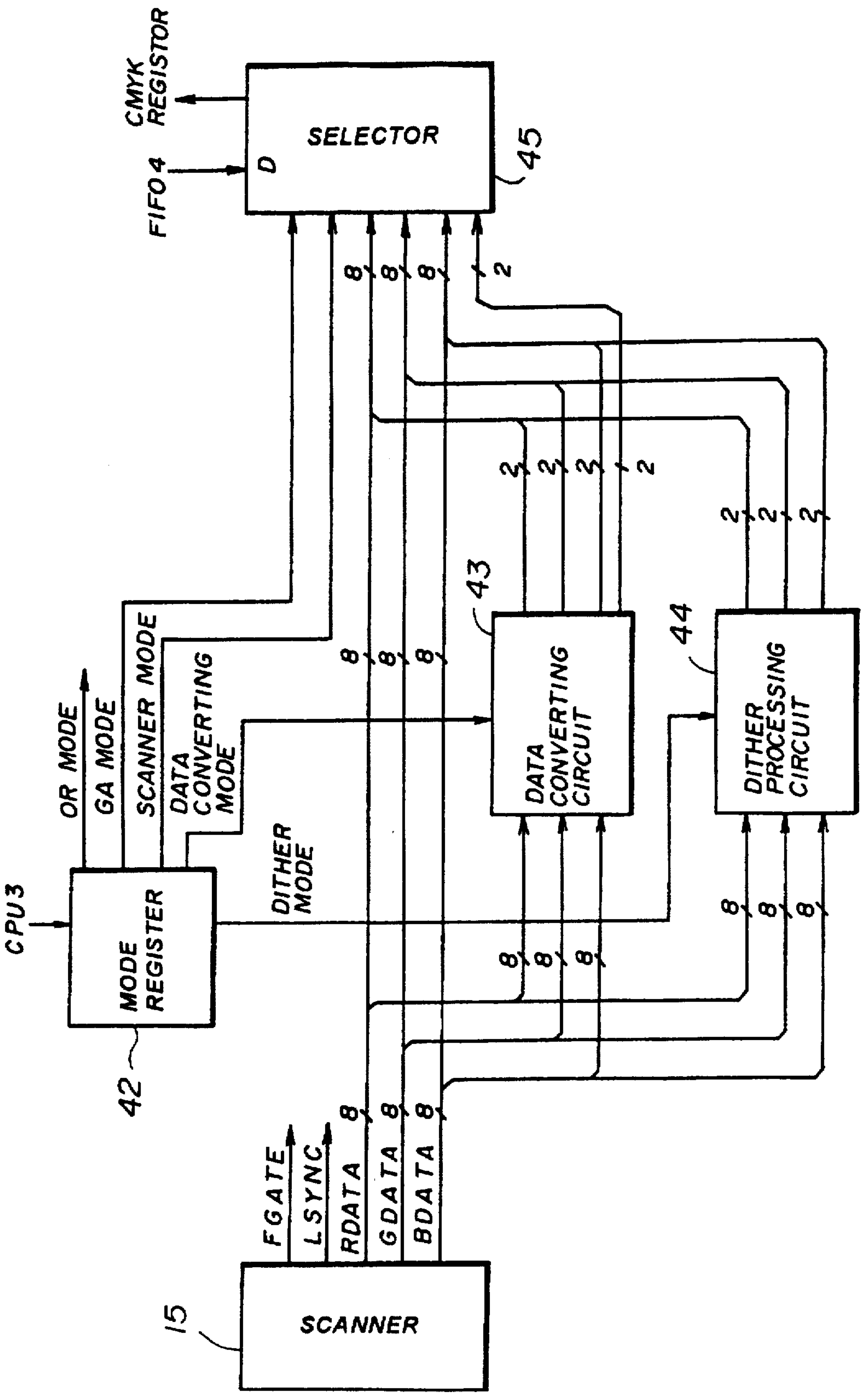
FIG. 4 shows in detail a block diagram of another part of the same image rendering apparatus.

More concretely, as shown in FIG.3, the image rendering apparatus 20 comprises:

an XS register 5 for storing rendering start addresses (start coordinates) relating to the main scan direction;

an XE register 6 for storing rendering end addresses (end coordinates) relating to the main scan direction;

a YS register 7 for storing rendering start addresses (start coordinates) relating to the sub-scan direction;

a YE register 31, acting as a sub-scan-direction end-address register, for storing rendering end addresses (end coordinates) in the main scan direction; and a CMYK register 32 for storing CMYK data indicating color-component density values.

Further, the same apparatus 20 further comprises:

an X-address counter 10 for generating rendering addresses in the main scan direction;

a Y-address counter 33 for generating rendering addresses in the sub-scan direction;

an address controller 34 for controlling the X-address counter 10 and Y-address counter 33;

a multiplier register 35 for storing a multiplier;

a multiplying unit 36 for multiplying the counted value (the rendering address in the sub-scan direction) in the Y-address counter 33 with the multiplier in the multiplier register 35;

an adder 37 for adding the counted value (the rendering address in the main scan direction) in the X-address counter 10 to the output value of the multiplying unit 36;

an X comparator (main scan direction comparator) 11 for reporting the end of rendering in the main scan direction; and a Y comparator (sub-scan direction comparator) 30 for reporting the end of rendering in the sub-scan direction.

The same apparatus 20 further comprises (referring also to FIG. 4):

a memory data control unit, comprising first and second latch circuits 38 and 39, an OR gate 40 and selector 41, for controlling a read, modify and write function associated with the image memory 2;

a mode register 42 for storing mode-specifying information;

a data converting circuit 43 for performing certain data conversion processing on the image data provided from the scanner 15;

a dither processing circuit 44 for performing dither processing on the image data provided through the scanner 15; and a selector 45 for selecting, in accordance with the mode specifying information in the mode register 42, any one unit from among data units respectively provided by the FIFO 4, scanner 15, data converting circuit 43, and dither processing circuit 44.

Next, an operation performed in the image processing system having the above construction will be described. In this operation, the image data represented by a page description language is used to render the corresponding image in the image memory 2.

A user produces one page of image data to be represented on the host computer 1, using a page description language, of which PostScript is a typical example. Then, the image data is sent to the CPU 3. The entirety of this image data consists of data specifying vectors. A figure comprising a circle or a curve is also represented with vectors. Then, the CPU 3 converts the entirety of the relevant vector data into the main-scan-direction straight-line-vector data, and then sends it to the image rendering apparatus 20 after sorting it.

Figure 5:
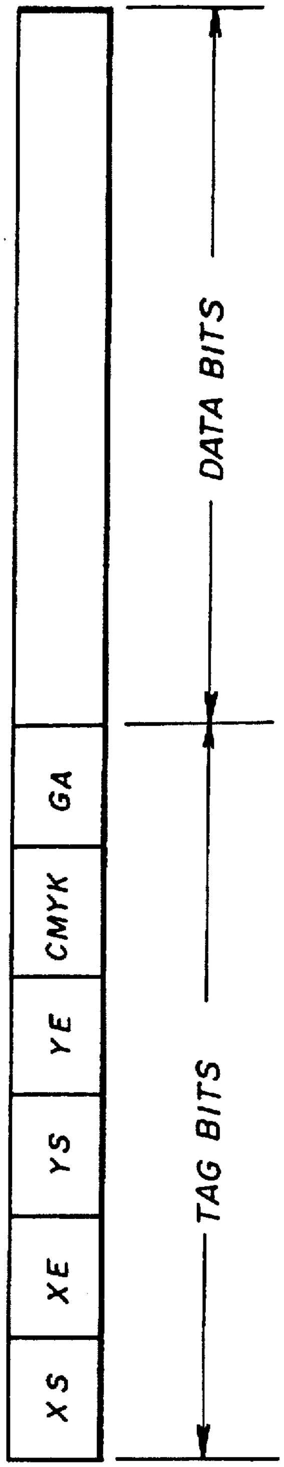
FIG. 5 illustrates an example of the construction of data input to an operation controller, shown in FIG. 3, from a FIFO.

The entirety of the image data thus provided to the image rendering apparatus 20 is sent to appropriate units via the FIFO 4. TAG bits as shown in FIG. 5 are attached to part of the data registered in the FIFO 4. The TAG bits are sent to the operation controller 13. The operation controller 13, by using the TAG bits, determines whether the data bits subsequent to the TAG bits (the data bits and the relevant TAG bits are simultaneously in parallel input to the FIFO), as shown in FIG. 5, comprise coordinate data, density data or a straight-line rendering command, thus distributing the relevant data units as described below accordingly.

The operation controller 13 latches the respective provided data units in appropriate registers in the following manner:

If the TAG bits indicate that the relevant subsequent data bits specify a rendering start point in the main scan direction, the relevant data unit is latched in the XS register 5;

if the TAG bits indicate that the relevant subsequent data bits indicate a rendering end point in the main scan direction, the relevant data unit is latched in the XE register 6;

if the TAG bits indicate that the relevant subsequent data bits indicate a rendering start point in the sub-scan direction, the relevant data unit is latched on the YS register 31; and if the TAG bits indicate that the relevant subsequent data buts indicate CMYK image data, the relevant data unit is latched in the CMYK register 32. Although image data represents an image with CMYK (cyan, magenta, yellow and black) color components in the present embodiment, it is also possible for the image data to represent an image with RGB (red, green and blue) color components.

Next, the address control unit 21 shown in FIG. 2 will be described.

If a straight-line rendering operation flag (GA) is set (activated) in the TAG bits, the address controller 34 of FIG. 3 loads the value in the XS register 5 in the X-address counter 10 and loads the value in the YS register 7 in the Y-address counter 33. Together with the above loading, the controller 23 provides a count enable signal XEN to the X-address counter 10.

Figure 6:
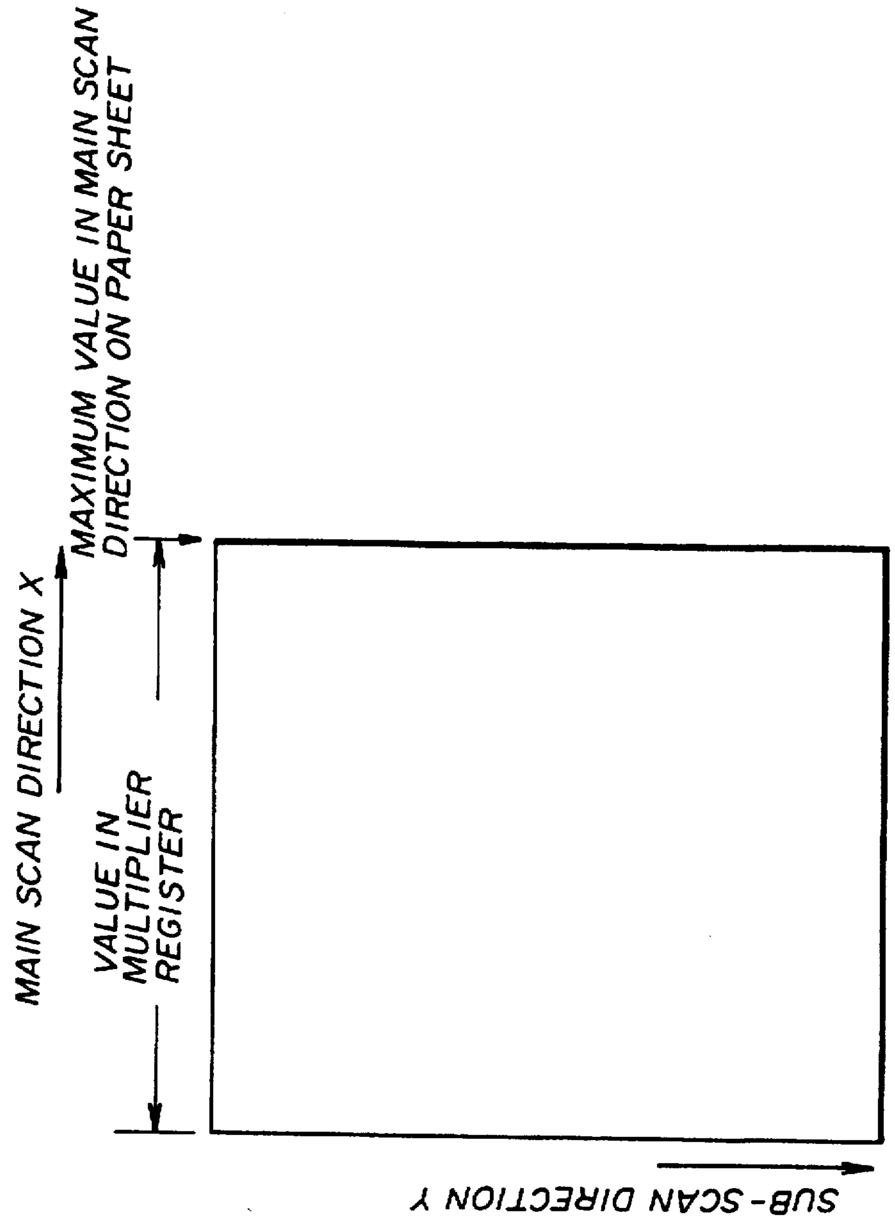
FIG. 6 illustrates a value in a multiplier register of FIG. 3.

The X-address counter 10, if the count enable signal XEN is asserted, increments the address in the main scan direction in synchronization with a pixel clock CLK. The multiplying unit 36 calculates the product of a multiplier previously stored in the multiplier register 35 by means of the CPU 3 and the counted value in the Y-address counter 33. The value in the multiplier register 35 comprises the value indicating the maximum width of a paper sheet in the main-scan-direction coordinates, as shown in FIG. 6. The paper sheet is used to have the relevant image printed out thereon. The adder 37 adds the counted value in the X-address counter 10 and the output of the multiplier 36, thus producing an address signal for the image memory 2.

By the above procedures, the relevant coordinates representing the X and Y in two dimensions is converted into a one-dimensional address A. The one-dimensional address A comprises a value resulting from the following calculation:

$$A=Y\cdot L+X;$$

where the letter Y represents the address in the sub-scan direction; the letter L represents the width, in the main scan direction, of the paper sheet for printing out the relevant image thereon; and the letter X represents the address in the main scan direction.

Then, after the counted value in the X-address counter 10 reaches the value in the XE register 6, the X comparator asserts a signal XEND. This assertion informs the address controller 34 that operation of rendering a single straight line vector is finished. As a result, the address controller 34 negates the count enable signal XEN, thus causing the counting up operation in the X-address counter 10 to be terminated.

Thus, the address control concerning the image memory 2 is implemented.

The value in the CMYK register 32 is written as it is in the image memory after passing through the first latch circuit 38 and selector 41. Thus, the color-component density values specified by the page description language are rendered in the image memory 2.

Next, an operation will be described where the image data provided from the scanner 15 is stored in the image memory 2.

When the image data is input through the scanner 15, scanner mode specification information is registered into the mode registered by means of the CPU 3. However, if the image data is desired to be written in the image memory 2 with a page description language, a straight-line rendering mode (GA) specification information is registered in the mode register 42. If the scanner-mode specification information is registered in the mode register 42, the selector 45 sends the image data provided through the scanner 15 to the CMYK register 32 so that the sent data is written in the CMYK register 32.

The scanner outputs:

a signal FGATE indicating that one page of the image data is being read;

a signal LSYNG comprising a synchronizing signal for each line; and the read image data comprising red data RDATA, green data GDATA and blue data BDATA.

The image data written in the CMYK register 32 is then stored in the image memory 2, the image data input by means of the scanner 15 being thus written to the image memory.

Next, processing for a case will be described where the number of tone levels associated with the scanner-input image data is greater than the number of tone levels associated with the image memory 2. The above number of tone levels of scanner-input image data is a number of tone levels with which the image data input via the scanner 15 represents the corresponding image. The above number of tone levels associated with the image memory 2 is a number of tone levels which the image memory 2 is capable of storing per pixel/dot of the corresponding image. In the present embodiment, the number of tone levels associated with the image memory 2 is 4 tone levels, that is, the relevant image data comprising 2 bit data, the 2 bits being then used to represent the 4 tone levels. The number of tone levels associated with the image data input through the scanner 15 is 256 tone levels, that is, the corresponding image data comprises 8 bit data.

There may be a case where the image data input through the scanner 15 is used to display the corresponding image on a display screen and the relevant image quality need not be particularly high. In such a case, it is sufficient that the two most significant bits are used among the above 8 bits of tone levels associated with the image data input through the scanner 15, the 2 bits of image data being thus stored in the image memory 2. Thus, the value in the CMYK register 32 is input to the image memory 2 as it is. However, in this case, the image memory 2 is capable of storing only the most significant two bits. Thus, although the 8-bit value in the CMYK register 32 is input to the image memory 2, only the most significant two bits in the 8-bit value are stored in the image memory 2 accordingly.

If high image quality is required in storing the image data, input through the scanner 15, in the image memory 2, the image data provided from the scanner 15 is registered in the image memory 2 without altering the original number of tone levels associated with the relevant image data. In this case, the CPU 3 registers a data converting mode specification information in the mode register 42, the data converting circuit 43 thus performing the necessary data converting processing on the relevant image data.

Figure 7:
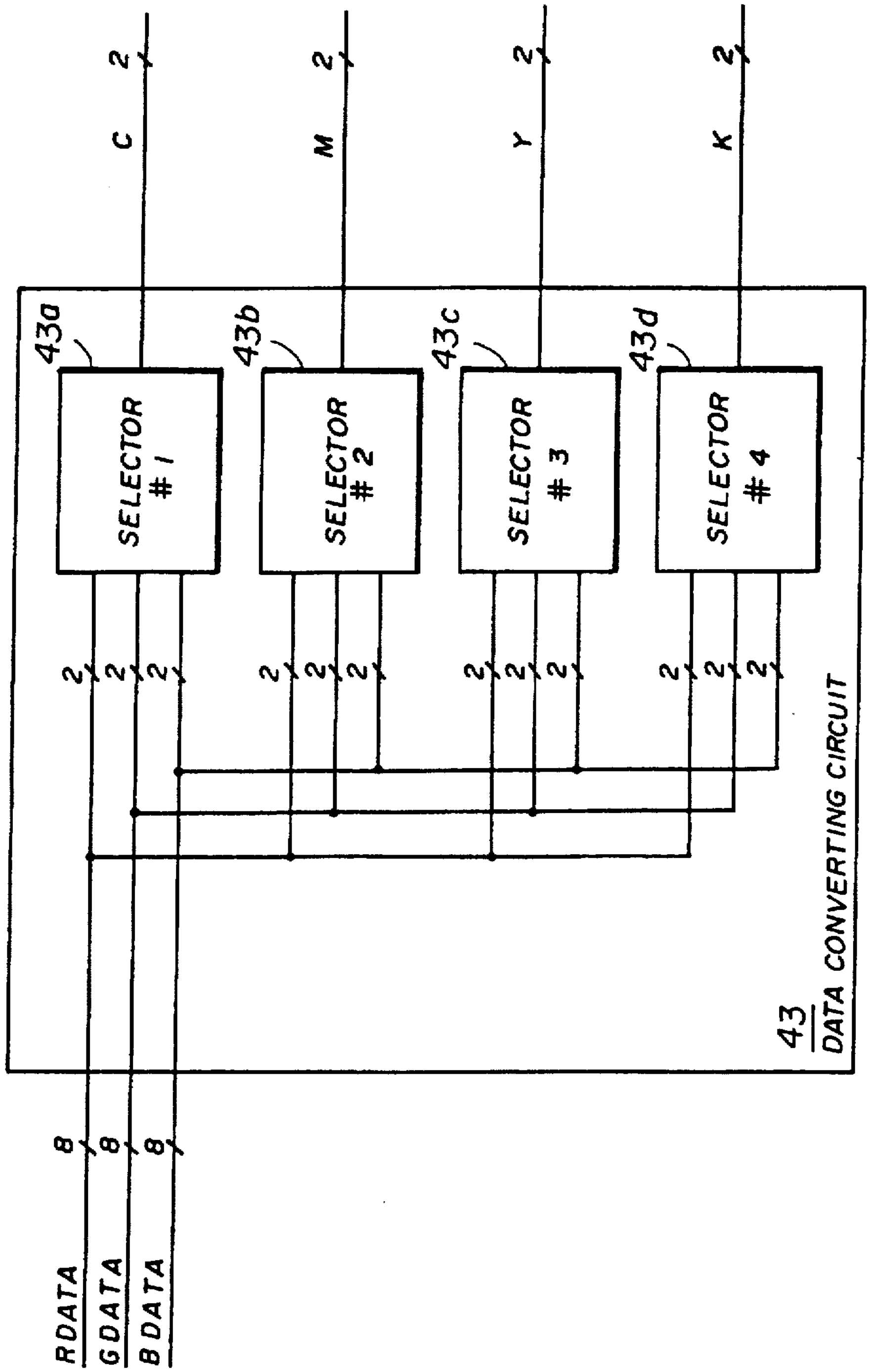
FIG. 7 shows, in detail, a block diagram of a data converting circuit of FIG. 4.

The data converting circuit 43 of FIG. 4 will be described with reference to FIG. 7. This circuit 43 comprises four selectors 43a–43d respectively corresponding to the four color components C, M, Y and K.

The 8 bit data associated with the data comprises three data sets, that is, the red data set RDATA, green data set GDATA and blue data set BDATA, are handled as described below. The most significant two bits among the 8 bits are input to the selector 43a; the subsequent two bits among the 8 bits are input to the selector 43b; the subsequent two bits among the 8 bits are input to the selector 43c; and the least significant two bits among the 8 bits are input to the selector 43d. While the image data corresponding to the red color R is to be used to be written in the image memory 2, each selector outputs the respective two bits associated with the red data set RDATA; while the image data corresponding to the green color G is to be used to be written in the image memory 2, each selector outputs the respective two bits associated with the green data set GDATA; and while the image data corresponding to the blue color B is to be used to be written in the image memory 2, each selector outputs the respective two bits associated with the blue data set BDATA.

Thus, in the case of handling RDATA, as the result of appropriate selecting operation by means of the selector 45, the most significant two bits in the 8-bit RDATA are written as the two bits normally meant for the C value in the CMYK register; the subsequent two bits in the 8-bit RDATA are written as the two M-value bits in the CMYK register; the subsequent two bits in the 8-bit RDATA are written as the two Y-value bits in the CMYK register; and the remaining least significant two bits in the 8-bit RDATA are written as the two K-value bits in the CMYK register. Thus, even if the image memory is capable of storing values of fewer tones than those in the scanner-read data, the full RGB data can be stored.

The CMYK register 32 is normally used for the full-color printing operation. More concretely, the CMYK register 32 is used in storing the relevant CMYK data in the image memory. The CMYK register 32 is capable of storing image data comprising a total of 32 bits consisting of the C, M, Y and K 8-bit values. Corresponding to this, the selector 45 in FIG. 4 is capable of outputting 32 bit data. However, it is also possible to use the CMYK register 32 to write the RGB data without converting into the CMYK data. In this case, 8 bits for each value RDATA, GDATA and BDATA are written, instead of a respective 8-bit values C, M, and Y, into the CMYK register 32, as a result of appropriate selecting operation by means of the selector 45.

Then, the respective four output data sets of the selectors 43a–43d are stored in the respective C, M, Y and K sub-registers in the CMYK register 32, the relevant data thus being written in the image memory 2. Thus, the 8 bits of each set of the red data set RDATA, green data set GDATA, and blue data set BDATA can be stored in the image memory 2 without reducing the number of bits associated with the 8-bit tone-level data.

However, this non-reduction in the number of data bits, that is, 8 bits for each color, naturally results in an increase in the amount of data to be written in the image memory 2 for a given area of an image to be rendered in the image memory 2, in comparison to the case where 2-bit tone-level image data is used. Thus, if the capacity of the image memory 2 is limited to one corresponding to the A-3 size image, for example, when the 2-bit tone-level data is used, only image data corresponding to an A-5 sized image area can be written in the image memory 2 when the 8-bit tone-level data is used. Thus, it is necessary to reduce the area of the original image to be read by means of the CPU 3 via the scanner 15 correspondingly.

There may be another case where storage of the image data originally input by means of the scanner 15 is desired to be performed while ensuring fulfillment of two conditions described below. First, prevent the area of the corresponding image read in via the scanner from being reduced as mentioned above. Second, maintain nearly the same image quality between the image data read in via the scanner 15 and the image data stored in the image memory 2. In order to fulfill the above conditions, the CPU 2 registers dither mode specification information in the mode register 42. Thus, the dither processing circuit 44 performs the dither processing on the relevant image data. That is, the dither processing circuit 44 performs 4-value dither processing on the relevant image data so as to convert each set of the red data set RDATA, green data set GDATA and blue data set BDATA, comprising the 8-bit tone-level data, into 2-bit data. These data sets RDATA, GDATA and BDATA are ones which have been input from the scanner 15.

Figure 8:
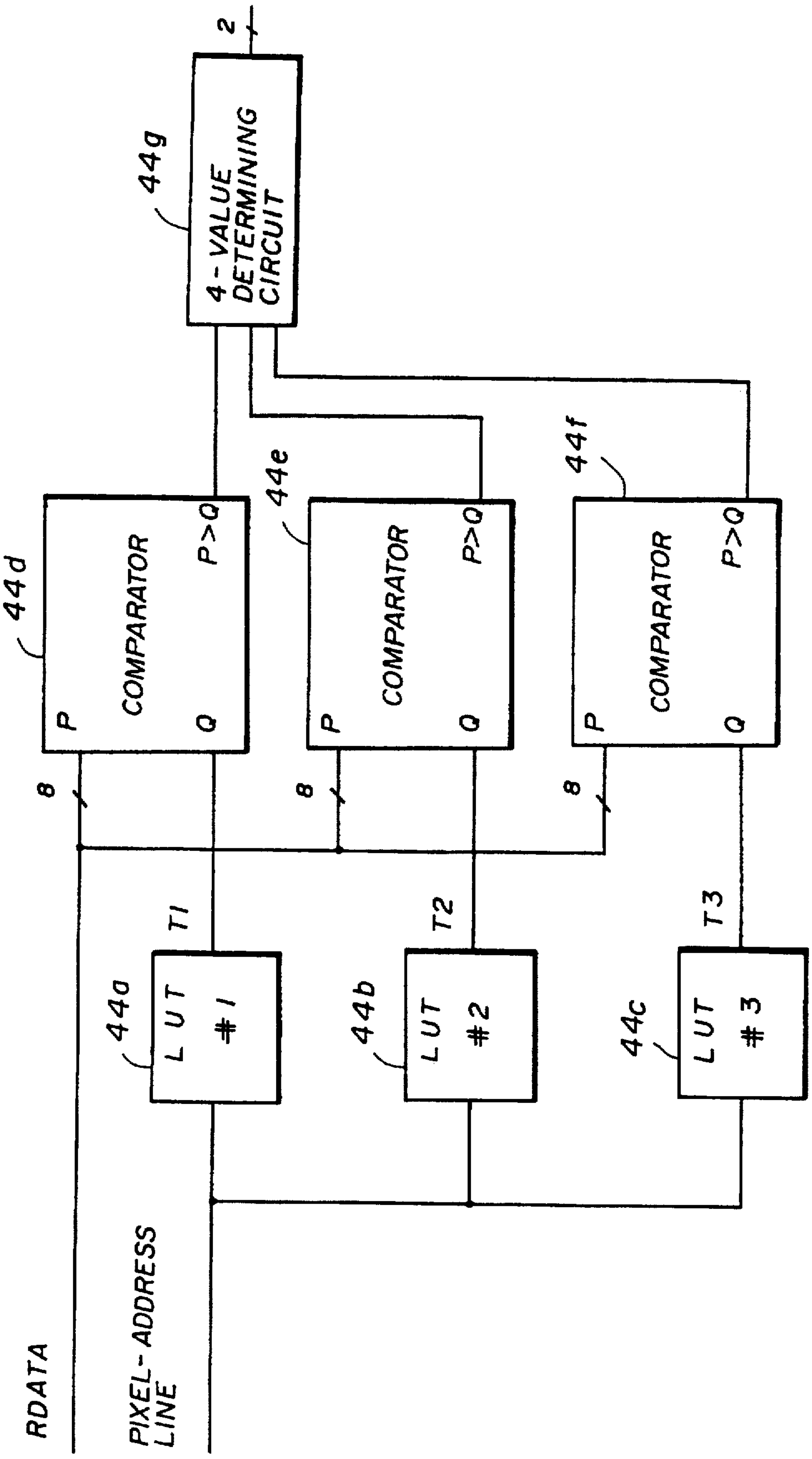
FIG. 8 shows, in detail, a block diagram of a dither processing circuit of FIG. 4.

In detail, as shown in FIG. 8, the dither processing circuit 44 provided for the red data RDATA comprises three latch circuits **44*a*–44*c*, three comparators 44*d*–44*f* and 4-value determining circuit 44*g*. Although FIG. 8** shows only the provision for the red data set RDATA, the constructions associated with provisions for the other data sets, GDATA and BDATA are similar to that for the set RDATA, corresponding respective drawings and descriptions thereof being thus omitted.

In order to implement the above 4-value dither processing, three threshold values are required for one pixel. Thus, in order to store these threshold values, the corresponding respective three latch circuits (look up tables) are provided as mentioned above. Among the three threshold values, the maximum threshold value is stored in the latch circuit **44*a* and the minimum threshold value is stored in the latch circuit 44*c***.

When the image data is provided from the scanner 15, each of the latch circuits **44*a*–44*c* provides the relevant threshold value specified by the address associated with the relevant pixel. Then, each of the comparators 44*d*–44*f* compares the thus provided respective threshold value with the red data RDATA comprising density data, sending the respective result to the 4-value determining circuit 44*g***.

The 4-value determining circuit **44*g***, if the RDATA value is greater than the maximum threshold value (T1), outputs the maximum 2-bit value (1 1); if the RDATA value is between the maximum threshold value (T1) and the middle threshold value (T2), it outputs the 2-bit value (1 0); if the RDATA value is between the middle threshold value (T2) and the minimum threshold value (T3), it outputs the 2-bit value (0 1); and if the RDATA value is smaller than the minimum threshold value (T3), it outputs the minimum 2-bit value ( 0 0).

Similar processing is also performed for the green data GDATA and blue data BDATA by similar circuits. Then, the outputs are stored in the CMYK register 32, thus being used to be written in the image memory 2. Thus, the dither processing can be performed on the image data input via the scanner 15.

Next, an operation will be described wherein image data input via the scanner 15 and the image data produced with the page description language are combined with one another in a composite image.

In order to implement such composition of image data, addresses in the image memory 2 are specified in a manner similar to the case where the straight line vectors are rendered in the image memory 2. However, since the image data is sent from the scanner 15 for each line, when the line synchronizing signal LSYNC is asserted, the address controller 34 asserts the signal YEN and increments the Y address by one. Producing the address signal in this way enables the composition using the image data of the different types. The relevant composing processing is described below.

Firstly, an operation will be described wherein the image data input from the scanner 15 is incorporated in an arbitrary area in the image memory In this case, when the image data input from the scanner 15 is to be incorporated in an arbitrary rectangular area in the image memory 2, the CPU 3 respectively stores: the start point, in the main scan direction, of the relevant rectangular area in the XS register 5; the end point, in the main scan direction, of the relevant rectangular area in the XE register 6; the start point, in the sub-scan direction, of the relevant rectangular area in the YS register 7; and the end point, in the sub-scan direction, of the relevant rectangular area in the YE register 31. However, in this case, being different from the case of rendering the straight line vectors, the FIFO 4 does not lie between the CPU 3 and the respective registers. Instead, the relevant data is written in the registers directly from the CPU 3.

Then, when the signal FGATE is asserted, the address controller 34 respectively loads: the value in the XS register 5 into the X-address counter 10; the value in the YS register 7 into the Y-address counter 33; the value in the XE register 6 into the X comparator 11; and the value in the YE register 31 into the Y comparator 30. The controller 34 further provides the count enable signal XEN to the X-address counter together with the above loading action.

When the count enable signal is asserted, the X-address counter 10 increments, in synchronization with the pixel clock CLK, the address in the main scan direction. Then, when the address value in the X-address counter 10 coincides with the value in the X comparator 11, the X comparator 11 provides the main-scan-direction writing-finish signal XEND, thus informing the address controller 34 of the end of writing of one line of data.

By this information, the address controller 34 provides the signal YEN to the Y-address counter 33 and then increments the Y address by one. Simultaneously, the controller 34 again loads the value in XS register 5 into the X-address counter 10. Then, in order to make writing of the data for the next line start at the time of the assertion of the signal LSYN, the incrementing of the X-address counter 10 remains disabled until the signal LSYNC is asserted.

The above action is performed repeatedly. Then, when the value in the Y-address counter 33 coincides with the value in the Y comparator 38, the Y comparator 38 provides the scanner writing finish signal YEND, thus informing the address controller 34 of the end of the relevant writing process. The address controller 34, when the next LSYN signal arrives, informs the CPU 3 that the writing in the image memory is finished.

Writing of the image data input from the scanner 15 in the arbitrary rectangular area in the image memory 2 in the above described manner enables the combination of the relevant scanner-input image data with the image data, produced with the page description language and written in the image memory 2, in a composite image.

Next, the operation will be described wherein, while the image data input via the scanner 15 is written in the image memory 2, the image data (background image) previously stored in the image memory 2 remains.

In this case, the CPU 3 registers, in the mode register 42, OR mode specification information.

In order to implement the read, modify and write operation performed when the relevant scanner-input data is written in the image memory 2, the operation described below is required. The data previously written in the image memory 2 at the address at which the relevant scanner-input data is to be written is latched in the second latch circuit 39

(see FIG. 3). Then, the value in the first latch circuit 38 and the value in the second latch circuit 39 are ORed (overlaid with one another) by means of the OR-gate circuit 40.

The above-mentioned specification of the OR mode in the mode register 42 causes the selector 41, shown in FIG. 3, to pass therethrough the image data, which has passed through the OR-gate circuit 40, to the data bus for the image memory 2.

Thus, using the OR-gate circuit 40 enables the image composition wherein the background previously written in the image memory either through the scanner 15 or with the page description language is not destroyed while the image data currently input through the scanner 15 is overlaid with the data previously written in the image memory 2.

Next, processing concerning the present invention and performed by the CPU 3 will be described with reference to FIGS. 9–14, the processing resulting in the above-described operation in the image rendering apparatus 20.

Figure 9:
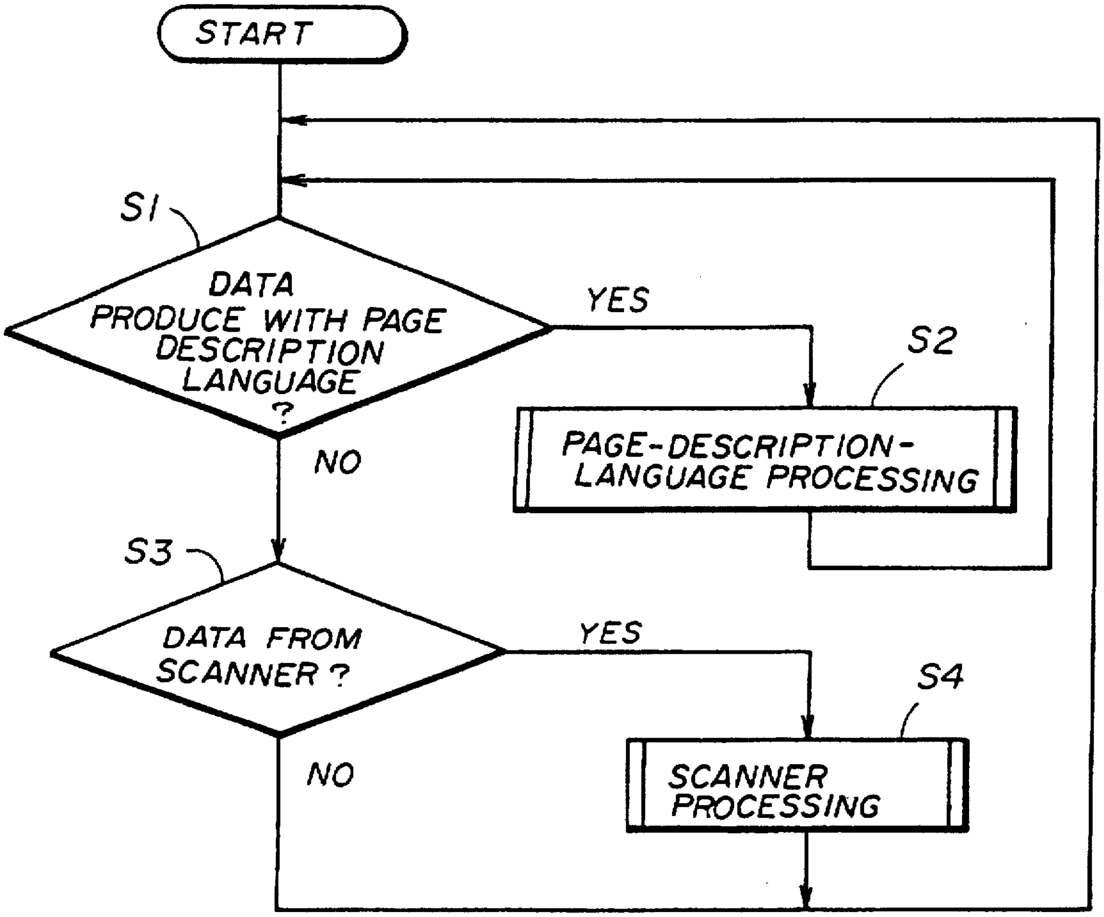
FIG. 9 shows an operation flow associated with processing, concerning the present invention, by means of a CPU 3 of FIG. 2.

The main routine of the processing concerning the present invention will be described with reference to FIG. 9. First, it is determined which kind of image data is input to the image rendering apparatus 20. If the data is produced with the page description language (YES in step S1), then page-description-language processing described below is performed (step S2). If the data is provided from the scanner 15 (YES in step S3), scanner processing described below is performed (step S4).

Figure 10:
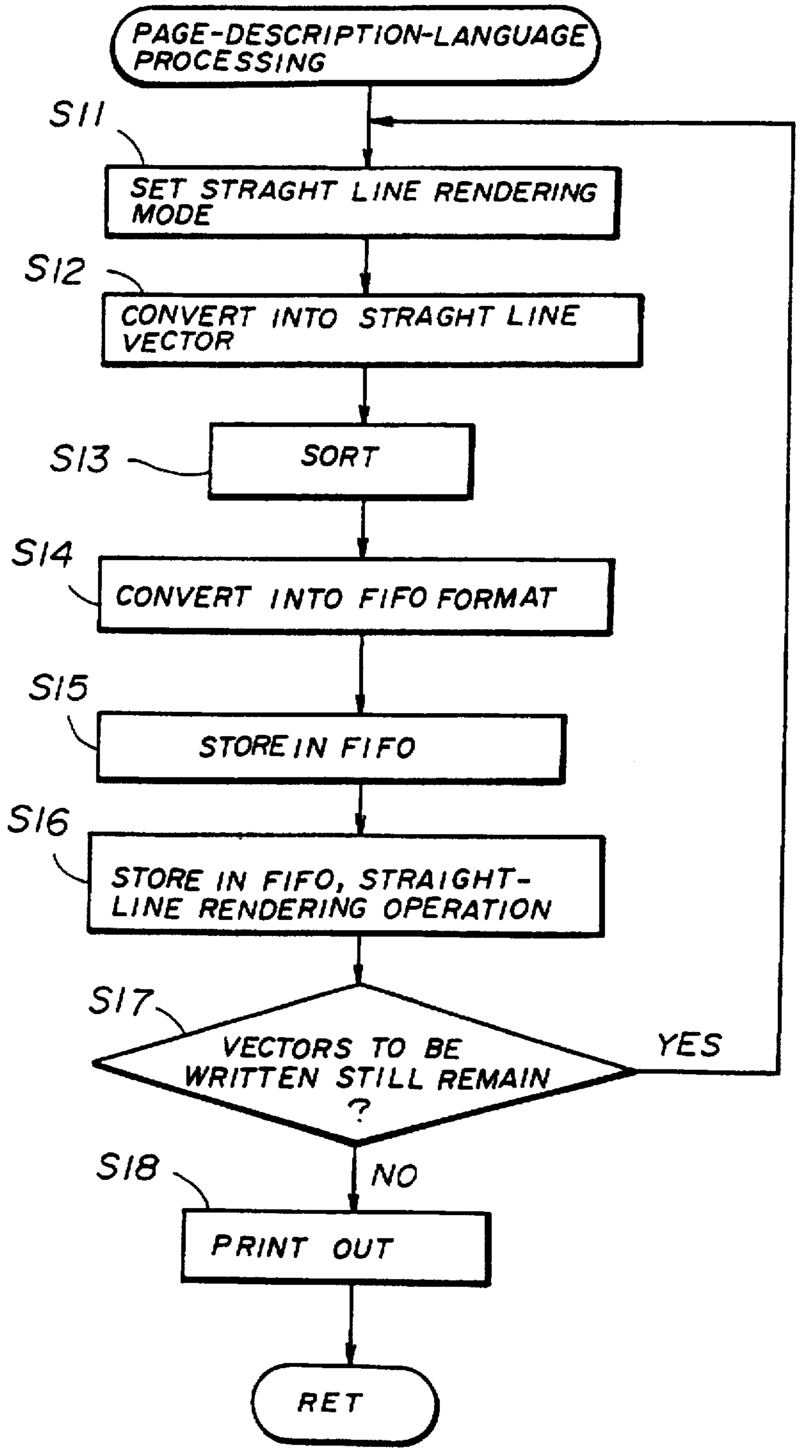
FIG. 10 shows an operation flow of a page description-language-processing subroutine of FIG. 9.

The subroutine concerning the page-description-language processing of FIG. 9 will be described with reference to FIG. 10. After setting the straight-line rendering mode in step S11 (the term 'step' will be omitted hereinafter), the relevant image data is converted into the straight-line-vector units in S12, the resulting data units being then sorted in S13. The sorted data is then converted to a format suitable for the FIFO 4 in S14 and the resulting data is stored in the FIFO 4 in S15.

Then, after the straight-line operation flag is registered in FIFO 4 in S16, it is determined in S17 whether or not vector data units to be written remain. If any (YES in S17), the above operation is repeated after returning to S1, but if none, this means the writing of the image data in the image memory 2 by means of the image rendering apparatus 20 has been completed. Thus, the relevant image data is transferred to a printer (not shown in the drawing) and printed out, thus returning to the main routine.

Figure 11:
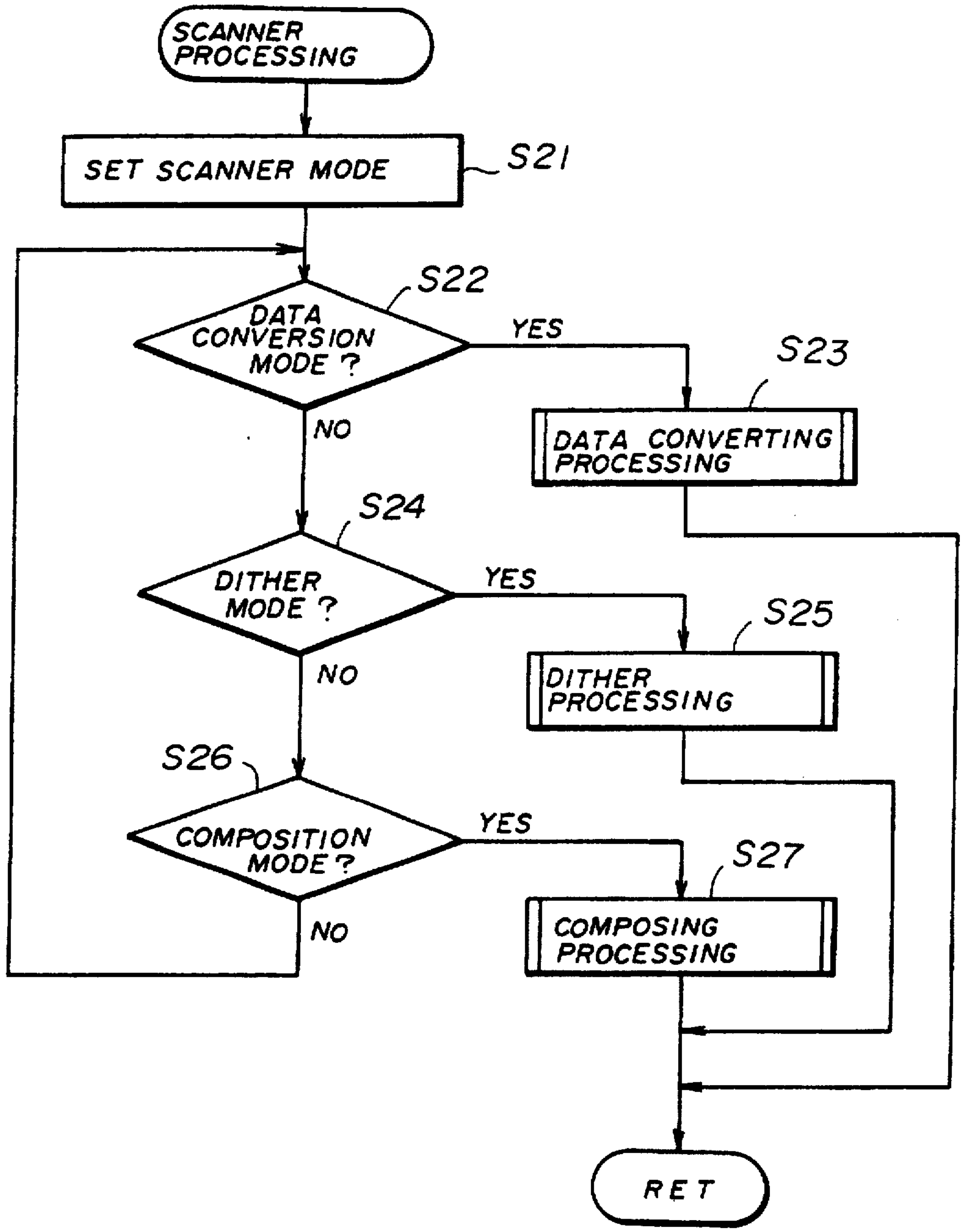
FIG. 11 shows an operation flow of a scanner-processing subroutine of FIG. 9.

The subroutine concerning the scanner processing of FIG. 9 will be described with reference to FIG. 11. After the scanner mode is set in S21, processing is performed according to a specification by the host computer 1. If the data conversion mode is specified (YES in S22), the data converting processing is performed in S23; if the dither mode is specified (YES in S24), the dither processing is performed in S25; and if the composition mode is specified (YES in S26), the composing processing is performed in S27. Then, the operation returns to the main routine.

Figure 12:
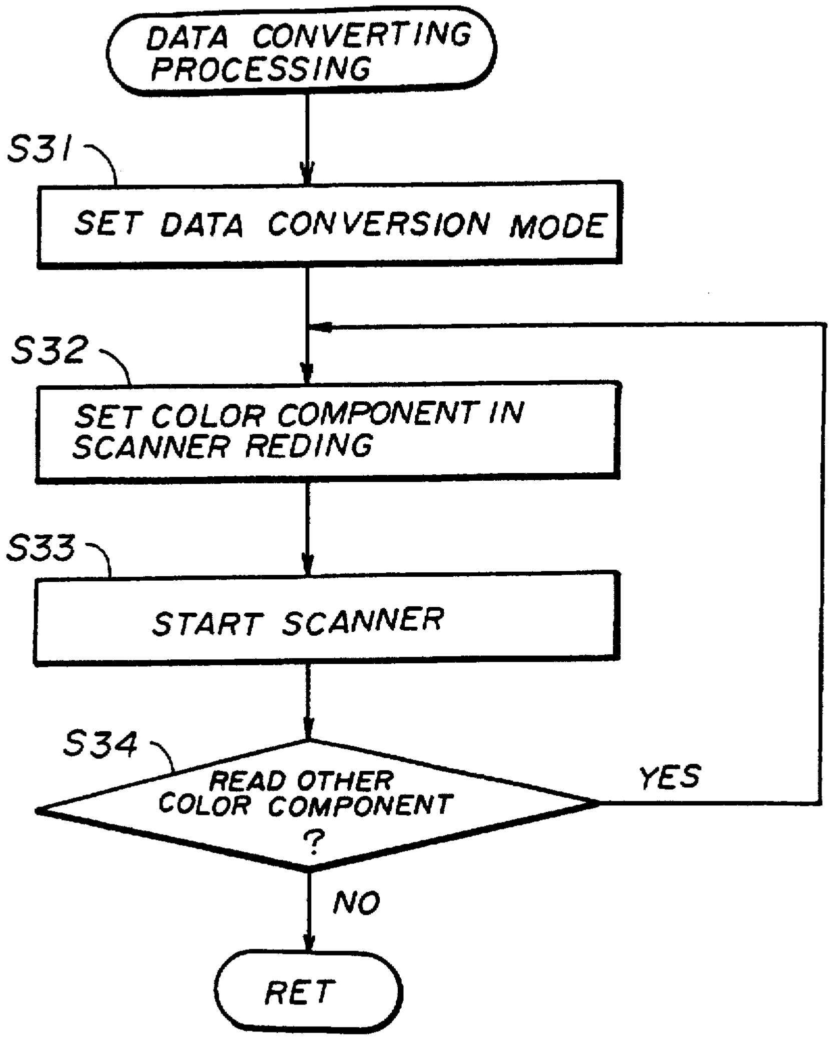
FIG. 12 shows an operation flow of a data-converting-processing subroutine of FIG. 11.

The subroutine concerning the data converting processing of FIG. 11 will be described with reference to FIG. 12. After the data conversion mode is set in S31, a color component in which the image data is input through the scanner 15 is set in S32, the scanner 15 being then started in S33. If another color component is to be selected for the scanner's reading (YES in S34), the above operation is repeated after returning to S31 so that the relevant color component is then set and the image scanned. If no other color component is to be selected (NO in S34), the operation immediately returns to the main routine.

Figure 13:
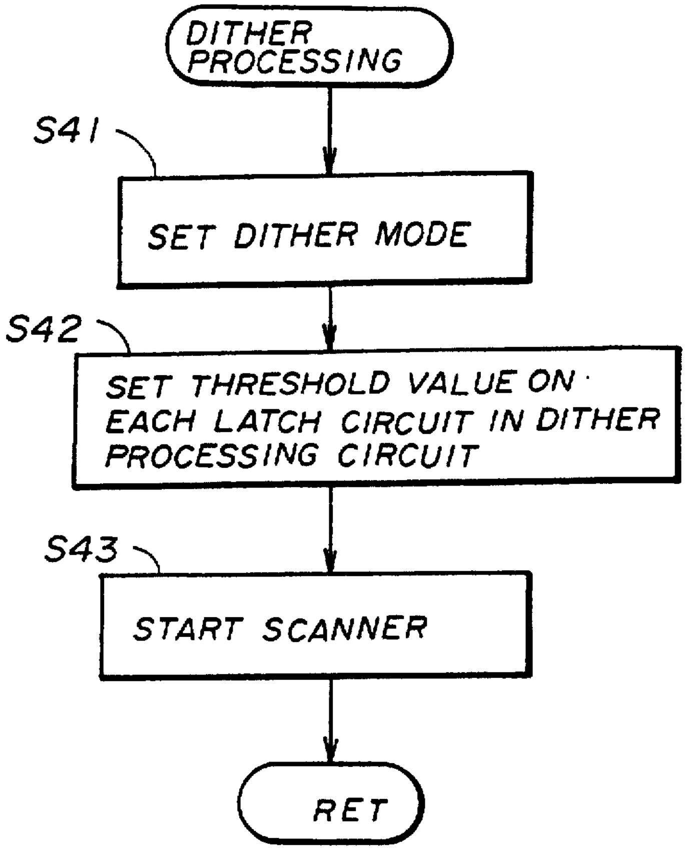
FIG. 13 shows an operation flow of a dither-processing subroutine of FIG. 11.

The subroutine concerning the dither processing of FIG. 11 will be described with reference to FIG. 13. After the dither mode is set in S41, the respective threshold value is set in each of the latch circuits in the dither processing circuit 44 in S42. Then, the scanner 15 is started in S43, and returned to the main routine.

Figure 14:
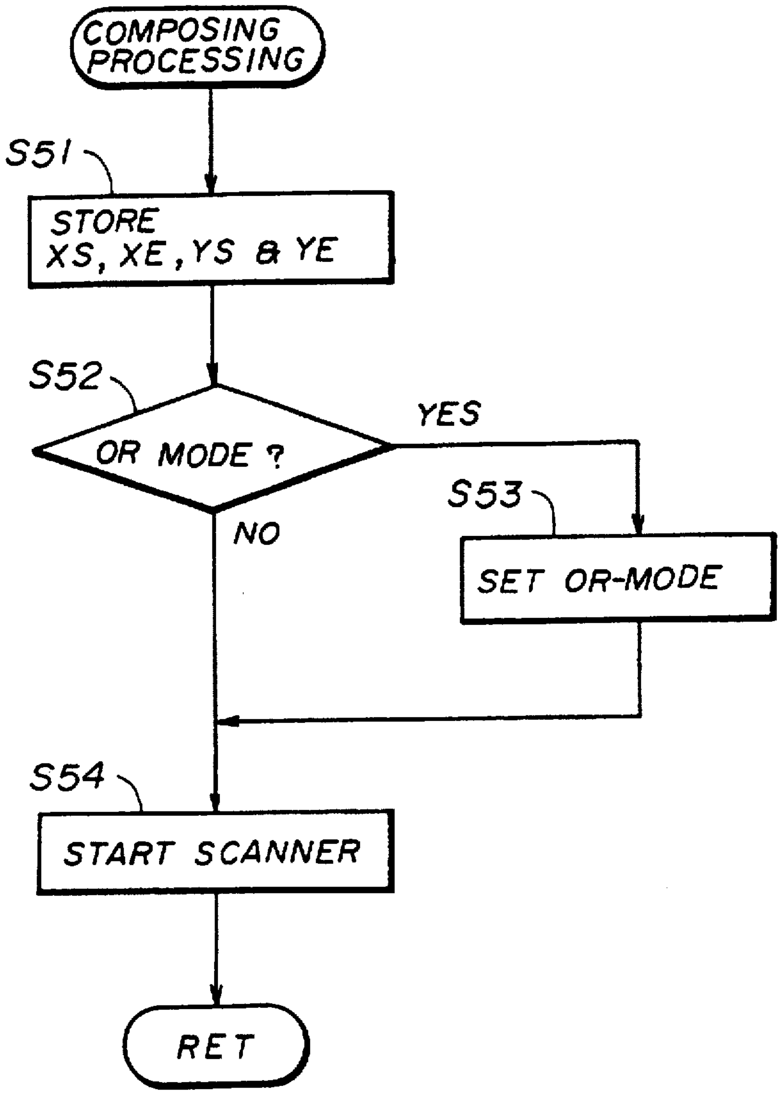
FIG. 14 shows an operation flow of a composing-processing subroutine.

The subroutine concerning the composing processing of FIG. 11 will be described with reference to FIG. 14. After the respective values XS, XE, YS and YE are stored in the FIFO 4 in S51, it is determined in S52 whether or not the OR mode is specified. If the OR mode is not specified (NO in S52), the scanner is started in S54. If the OR mode is specified (YES in S52), the scanner is started in S54 after the OR mode is set in S53. Then, the operation returns to the main routine.

Thus, according to the image rendering apparatus 20 in the embodiment of an image processing system according to the present invention, it is possible to reduce the additional image memory provided for image data input via the scanner 15, thus reducing the cost of the apparatus. This is because, as described above, the shared image memory 2 is used so that data to be provided to the memory 2 is switched between the data input through the scanner 15 and the data provided from the host computer 1.

Further in the apparatus 20, reduction of the scanned area of an original image and/or performance of the dither processing on the image data obtained by the scanner 15 may prevent the finally rendered image from being degraded in image quality. (The image memory 2 comprises four areas, one for each of four basic color components.) Such procedure is effective in a case where the number of tone levels associated with the image data provided through the scanner 15 is larger than the number of tone levels with which the image memory 2 may store the relevant image data. Such differences in the numbers of tone levels may result in degrading the finally rendered image unless the above processing is be performed.

Further, in the apparatus 20, the data from both the host computer 1 and the scanner 15 may be combined in a composite image.

For this purpose, in the apparatus 20, the two-dimensional (main-scan dimension and sub-scan dimension) addresses formed by the X-address counter (main scan direction counter) 10 and Y-address counter (sub-scan direction counter) 33 are converted to the one-dimensional addresses to be used to address the image memory 2. As a result, it is possible to make the format of both kinds of address the same, the both kinds of address being a first kind used for writing the image data in the image memory 2 initially and a second kind associated with the image data input via the scanner 15. Thus, data composition may be made between data provided from both the host computer 1 and scanner 15 so that the composition image is printed out, thus the capability of the image rendering apparatus 20 being improved.

Further, the apparatus 20 comprises the XS register (main scan direction start register) 5, XE register (main scan direction end register) 6, YS register (sub-scan direction start register) 7, YE register (sub-scan direction end register) 31, X comparator (main scan direction comparator) 11 and Y comparator (sub-scan direction comparator) 38. As a result, it is possible to write the image data input via the scanner 15 into an arbitrary rectangular area in the image memory 2. Thus, it is possible to combine the thus written image data with the image data input from the host computer 1, thus obtaining a composite printed image.

Further, the image processing apparatus 20 can control read, modify and write processing for said image memories, thus overlaying the image data stored in said image memory 20 with the image data input via the scanner 15 so as to write the resulting data in the image memory 2. As a result, the above data composition process may be ensured since the image data previously written in the image memory 2 may be maintained as it is.

Further, the present invention is not limited to the above described embodiments, and variations and modifications may be made without departing from the scope of the present invention.

What is claimed is:

1. An information processing system for processing image data input through an image scanner, comprising:

an image memory for storing image data in a form for realizing the corresponding image on a recording medium and in a number of tone levels associated with said image memory, wherein said number of tone levels associated with said image memory is smaller than a number of tone levels associated with said image data input through said image scanner; and a central processing unit controlling scanner modes of the information processing system and registering scanner mode specification information corresponding to said scanner modes, wherein at least a first one of said scanner modes reduces the number of tone levels of the image data input through the image scanner and an alternative second one of said scanner modes reduces the size of a read-in area of the image scanned by the image scanner and wherein it possible to selectively change from said first tone-level reduction mode and said second read-in area reduction mode.

2. An information processing system according to claim 1, wherein said system further comprises:

straight-line-vector processing means for processing straight line vectors associated with image data provided thereto into resulting image data to be stored in said image memory; and data switching means for switching between one of the resulting image data obtained from said straight-line-vector processing means and said image data input through said scanner to store one of said resulting data and input image data in said image memory.

3. The information processing system according to claim 2, wherein:

said straight-line-vector processing means comprises:

data expanding means for expanding the image data provided from a host computer into corresponding main-scan-direction straight line vectors; and data generating means for generating the start and end addresses associated with the straight line vectors and relevant density values associated with the image data;

said image memory comprises areas, each provided for a respective basic color component associated with the data to be stored, for storing either single tone values or multitone values; and said image processing system further comprises image rendering means for writing the image data in each dot in said image memory based on the data provided by said straight-line-vector processing means.

4. The information processing system according to claim 3, further comprising:

a main scan direction counter for generating two dimensional addresses, in the main scan direction, to be provided to said image rendering means;

a sub-scan direction counter for generating the two-dimensional addresses, in the sub-scan direction, to be provided to said image rendering means; and dimension converting means for converting the two-dimensional addresses provided by said main scan and sub-scan counters into one-dimensional addresses for addressing said image-memory means.

5. The information processing system according to claim 4, further comprising:

a main scan direction start register for storing main scan direction starting coordinates of representing rectangular areas;

a main scan direction end register for storing main scan direction end coordinates of representing said rectangular areas;

a sub-scan direction start register for stroing sub-scan direction start coordinates of representing rectangular areas;

a sub-scan direction end register for stroing sub-scan direction end coordinates of representing said rectangular areas;

a main scan direction comparator for comparing the data provided by said main scan direction counter and the data stored in said main scan direction end register; and a sub-scan direction comparator for comparing the data provided by said sub-scan direction counter for the data stored in said sub-scan direction end register.

6. The information processing system according to claim 5, further comprising background-image preserving means for controlling read, modify and write processing for said image-memory means, said preserving means overlaying the image data stored in said image-memory means with the image data input through said data inputting means so as to write the resulting data in said image-memory means.

7. The information processing system according to claim 2, wherein:

said image memory comprises at least three areas corresponding to a respective three basic color components;

said image processing system further comprises areas reducing means for reducing the area in the original image to be read by said image scanner, if the number of tone levels associated with the data input through said image scanner exceeds the number of tone levels associated with said image memory.

8. The information processing system according to claim 2, wherein:

said image memory comprises at least three areas corresponding to a respective three basic color components;

said image processing system further comprises dither-processing means for performing dither processing on the data input through said image scanner if the number of tone levels associated with the data input through said image scanner exceeds the number of tone levels associated with said image memory.

9. The information processing system according to claim 2, wherein said image memory comprises a memory in which image data represented by a page description language is used to render a corresponding image.

10. The information processing system according to claim 2, wherein said data switching means comprises a selector switching between said resulting image data from said straight-line-vector processing means and said image data input from said image scanner.

11. The information processing system according to claim 2, further comprising a mode register configured to output mode signals to said data switching means and wherein said data switching means switches image data in response to said mode signals.

12. The information processing system according to claim 11, further comprising an operation controller and wherein said straight-line-vector processing means provides control signals to said mode register and said operation controller.

13. The information processing system according to claim 2, further comprising a multiplier register and a multiplying unit configured to multiply addresses output from an address control unit in response to a control signal from said straight-line-vector processing means.

14. An information processing system, according to claim 1, wherein said image memory receives a plurality of units of image data representing an image, stores said plurality of units of image data in a plurality of memory locations corresponding respectively to pixels of said image and outputting said plurality of units of image data in response to a read signal to record said image on said recording medium;

wherein said information processing system further comprises straight-line-vector processing means for processing straight line vectors associated with image data provided thereto into a resulting first plurality of units of image data to be received and stored in said plurality of memory locations of said image memory respectively corresponding to pixels of said image; and data switching means for switching between one of the resulting first plurality of units of image data obtained from said straight-line-vector processing means and a second plurality of units of input image data obtained from said image scanner and outputting one of the resulting first plurality of units of image data and the second plurality of units of input image data at an output connected to said input port of said image memory to store said one of said resulting first plurality of units of image data and the second plurality of units of input image data in said plurality of memory locations of said image memory respectively corresponding to pixels of said image.

15. The information processing system according to claim 14, wherein:

said straight-line-vector processing means comprises data expanding means for expanding the image data provided from a host computer into corresponding main-scan-direction straight line vectors and data generating means for generating the start and end addresses associated with the main-scan-direction straight line vectors and relevant density values associated with the image data provided from said host computer;

said image memory comprises areas, each provided for a respective basic color component associated with the data to be stored, for storing either single tone values or multi-tone values; and said image processing system further comprises image rendering means for writing the image data in each respective memory location of said image memory based on the data provided by said straight-line-vector processing means.

16. The information processing system according to claim 14, wherein:

said image memory comprises at least three areas corresponding to a respective three basic color components;

said image processing system further comprises area reducing means for reducing the area in the original image to be read by said image scanner, if the number of tone levels associated with the data input through said image scanner exceeds the number of tone levels associated with said image memory.

17. The information processing system according to claim 14, wherein:

said image memory comprises at least three areas corresponding to a respective three basic color components;

said image processing system further comprises dither-processing means for performing dither processing on the data input through said image scanner if the number of tone levels associated with the data input through said image scanner exceeds the number of tone levels associated with said image memory.

18. The information processing system according to claim 14, wherein said image memory comprises a memory in which image data represented by a page description language is used to render a corresponding image.

19. An information processing system as set forth in claim 1 wherein said image memory is used commonly for storing image data input through the scanner and for storing image data input from a host computer.

20. An information processing system comprising:

straight-line-vector processing means for processing straight line vectors associated with image data provided thereto into resulting image data to be stored in said image memory; and data switching means for switching between one of the resulting image data obtained from said straight-line-vector processing means and said image data input through said scanner to store one of said resulting data and input image data in said image memory;

the information processing system wherein;

said straight-line-vector processing means comprises:

data expanding means for expanding the image data provided from a host computer into corresponding main-scan-direction straight line vectors; and data generating means for generating the start and end addresses associated with the straight line vectors and relevant density values associated with the image data;

said image-memory means comprises areas, each provided for a respective basic color component associated with the data to be stored, for storing either single tone values or multi-tone values; and said image processing system further comprises image rendering means for writing the image data in each dot in said image-memory means based on the data provided by said straight-line-vector processing means; and wherein said image inputting means comprises an image scanner;

the information processing system further comprising:

a main scan direction counter for generating two dimensional addresses, in the main scan direction, to be provided to said image rendering means;

a sub-scan direction counter for generating the two-dimensional addresses, in the sub-scan direction, to be provided to said image rendering means; and dimension converting means for converting the two-dimensional addresses provided by said main scan and sub-scan counters into one-dimensional addresses for addressing said image-memory means.

21. The information processing system according to claim 20, further comprising:

a main scan direction start register for storing main scan direction starting coordinates of representing rectangular areas;

a main scan direction end register for storing main scan direction end coordinates of representing said rectangular areas;

a sub-scan direction start register for stroing sub-scan direction start coordinates of representing rectangular areas;

a sub-scan direction end register for stroing sub-scan direction end coordinates of representing said rectangular areas;

a main scan direction comparator for comparing the data provided by said main scan direction counter and the data stored in said main scan direction end register; and a sub-scan direction comparator for comparing the data provided by said sub-scan direction counter for the data stored in said sub-scan direction end register.

22. The information processing system according to claim 20, further comprising background-image preserving means for controlling read, modify and write processing for said image-memory means, said preserving means overlaying the image data stored in said image-memory means with the image data input through said data inputting means so as to write the resulting data in said image-memory means.

23. An information processing system comprising:

image-memory means for storing image data in a form for realizing the corresponding image on a recording medium;

straight-line-vector processing means for processing straight line vectors associated with image data provided thereto into resulting image data to be stored in said image-memory means; and data switching means for switching between one of the resulting image data obtained from said straight-line-vector processing means and input image data obtained from image inputting means to store one of said resulting data and input image data in said image-memory means;

the information processing system further comprising a mode register configured to output mode signals to said data switching means and wherein said data switching means switches image data in response to said mode signals;

the information processing system further comprising an operation controller and wherein said straight-line-vector processing means provides control signals to said mode register and said operation controller.

24. An information processing system comprising:

image-memory means for storing image data in a form for realizing the corresponding image on a recording medium;

straight-line-vector processing means for processing straight line vectors associated with image data provided thereto into resulting image data to be stored in said image-memory means; and data switching means for switching between one of the resulting image data obtained from said straight-line-vector processing means and input image data obtained from image inputting means to store one of said resulting data and input image data in said image-memory means;

the information processing system further comprising a multiplier register and a multiplying unit configured to multiply addresses output from an address control unit in response to a control signal from said straight-line-vector processing means.

* * * * *

UNITED STATES PATENT AND TRADEMARK OFFICE

CERTIFICATE OF CORRECTION

PATENT NO. : 5,748,947

DATED : May 5, 1998

INVENTOR(S) : Tokutaro FUKUSHIMA

It is certified that error appears in the above-indentified patent and that said Letters Patent is hereby corrected as shown below:

On the title page, item [63] should read as follows:

Related U.S. Application Data

--[63] Continuation of Ser. No. 580,773, Dec.29, 1995, abandoned, which is a continuation of Ser No. 200,424, Feb. 23, 1994, abandoned.--

Signed and Sealed this

Sixth Day of October, 1998

*Attest:*

BRUCE LEHMAN

*Attesting Officer*

*Commissioner of Patents and Trademarks*